June 26, 1956  J. A. HOLLAND  2,751,979
TIRE TREAD TRIMMING MACHINE
Filed Dec. 29, 1953  2 Sheets-Sheet 1
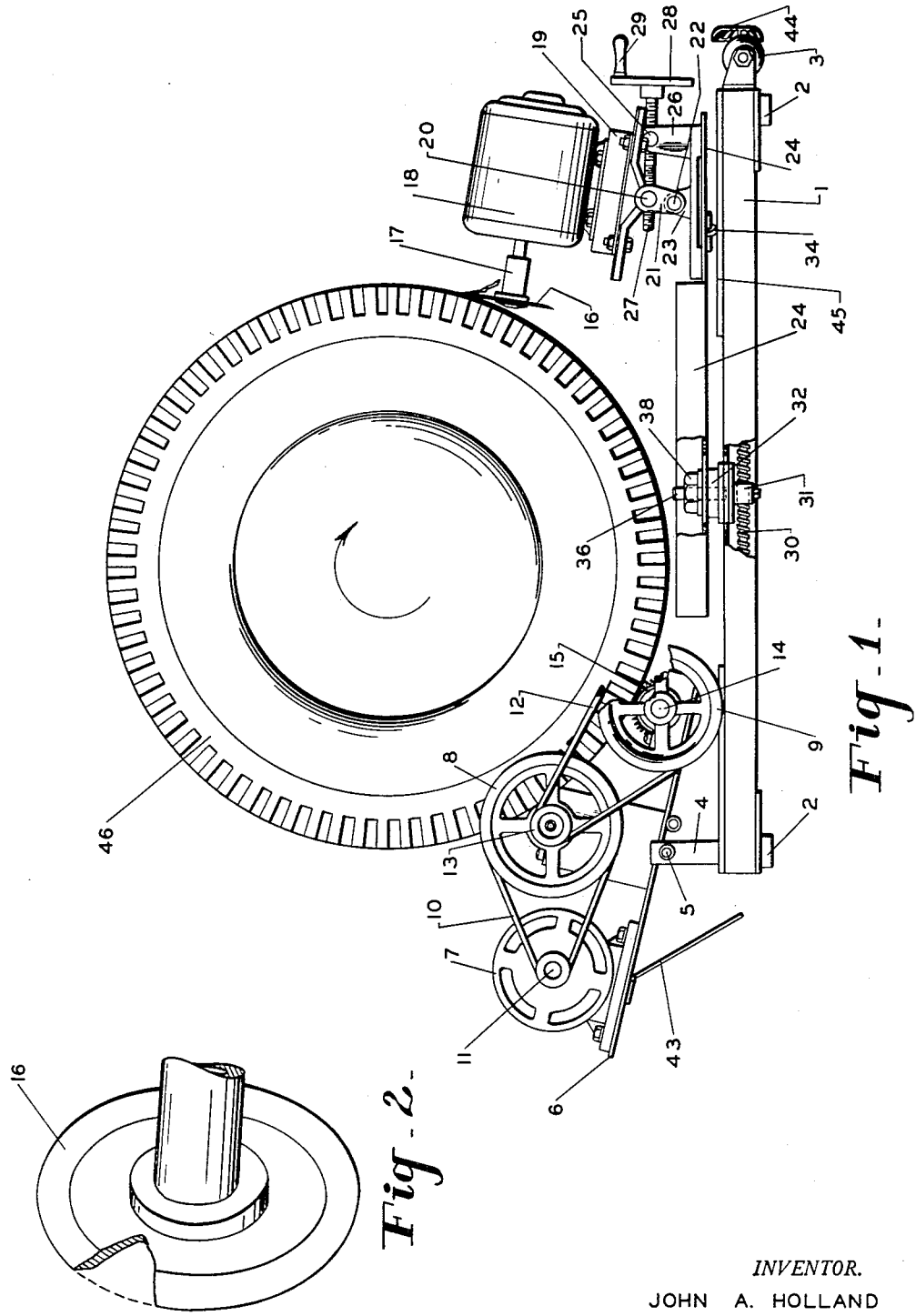
INVENTOR.
JOHN A. HOLLAND
BY
Frank H. Harmon
ATTORNEY June 26, 1956  J. A. HOLLAND  2,751,979
TIRE TREAD TRIMMING MACHINE
Filed Dec. 29, 1953  2 Sheets-Sheet 2
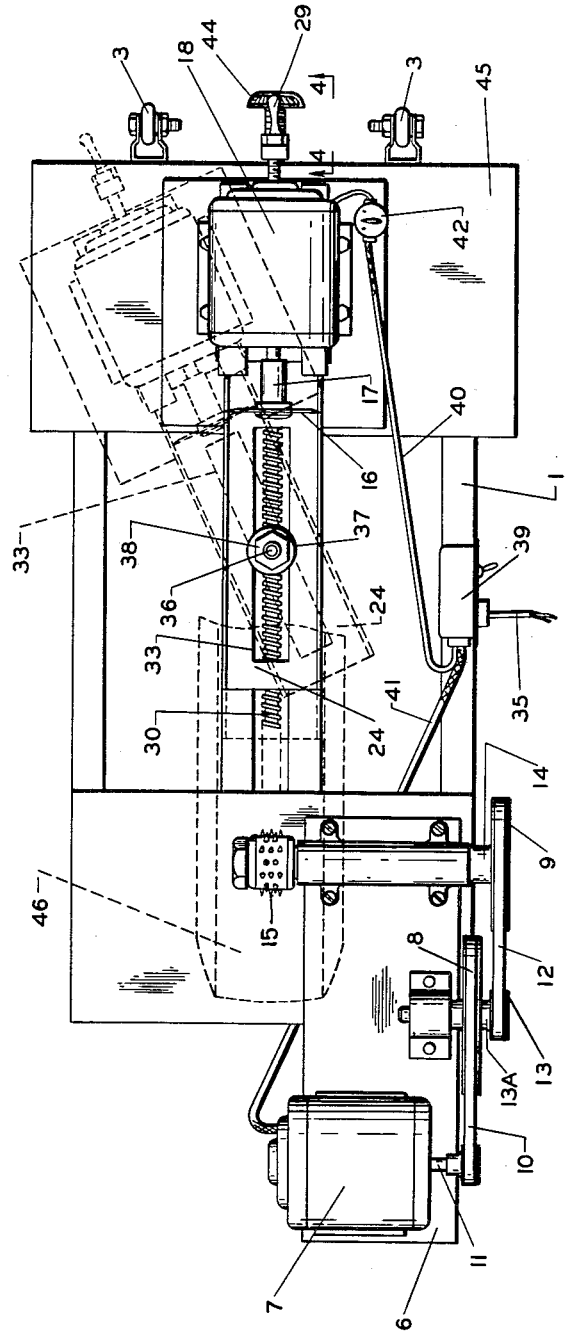
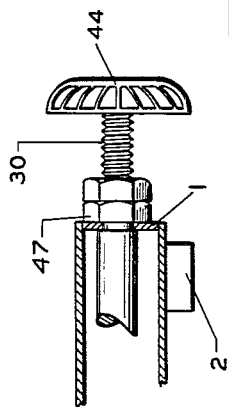
INVENTOR.
JOHN A. HOLLAND
BY
*Frank A. Harmon*
ATTORNEY

United States Patent Office 2,751,979
Patented June 26, 1956

2,751,979

TIRE TREAD TRIMMING MACHINE

John A. Holland, Riverside, Calif.

Application December 29, 1953, Serial No. 401,005

6 Claims. (Cl. 164—10.2)

This invention relates to cutting machines primarily designed for trimming the treads of tires to true the tires so as to perfect their running balance when in use on a vehicle.

My invention contemplates the use of a mobile platform for carrying a tire driving or rotating unit and a tire tread cutting unit.

One of the primary objects of my invention is to incorporate in such a unit, means for adjusting the angular disposition of the tire with respect to the tire tread cutter, whether the tire is removed from the vehicle wheel or while still on the wheel while the vehicle on which the tire is mounted is jacked up, and also means for rotating the tire at a predetermined slow speed for purposes of uniformity of tread cutting in order to true the running balance of the tire.

Another object is to also incorporate in the mobile platform a cutting unit that includes a rotating circular cutting blade and which unit will also include means for adjusting the angular disposition of the blade in three different planes with respect to the radius normal to the main radius of the tire, namely axially thereof and throughout arcuate movements both transversely and vertically thereof.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in side elevation of the tire trimming machine, including the mobile platform, the tire and the tire supporting bracket, the motor drive for rotating the tire and the adjustable tire tread trimming unit, including the motor driven rotating circular cutting blade, the means for pivotally adjusting the blade arcuately vertically with respect to the radius normal to the main radius of the tire, the platform being partially broken away to show the tire tread trimming unit adjustably connected to the platform about a vertical pivot and adjustable longitudinally of the platform by nut and worm;

Figure 2 is a detail view in perspective, partly broken away, of the rotatable circular cutting blade;

Figure 3 is a view in top plan view of that shown in Figure 1, showing the tire cutting unit in full lines to be axially in alignment with the radius normal to the main radius of the tire and in dotted lines angularly swung about its vertical pivotal connection to the platform so as to adjust the cutting blade transversely arcuately with respect to the axis normal to the main radius of the tire; and Figure 4 is a fragmentary detail view, partly in side elevation and partly in section, showing the nut and worm means for axial adjustment of the tire trimming unit.

Referring more particularly to the drawings, the device may include a generally rectangular supporting frame 1 with cushion posts 2 to absorb vibration, and wheels 3 to assist the operator in moving the device from place to place to the desired location.

Transversely pivotally and adjustably connected to a post 4 at 5 is a table 6, to which are secured an electric motor 7, and idler wheel 8 and a tire driving wheel 9. Idler wheel 8 is driven by a belt 10 that is driven by motor shaft 11 and wheel 9 is driven by a belt 12 that engages pulley 13 carried by the axle 13A that also carries wheel 8. The axle 14 of wheel 9 carries a drum 15 that is provided with peripherally arranged spikes upon which the tire 46 rests, by means of which spikes a rotation of the drum imparts rotative movement to the tire.

The tire tread cutting unit includes a circular cutting blade 16 that is driven by shaft 17 of an electric motor 18 mounted on a base 19. Base 19 is pivotally connected at 20 to a link 21, which in turn is pivotally connected at 22 to a stationary bracket 23 secured to the platform 24 for supporting the tire tread trimming unit. Extending through, and in screw-threaded engagement with transverse pivot pin 20, of link 21, and through a pin 25 of stationary post 26, is a screw bolt 27 that is secured to a hand wheel 28 that is manually rotated by a handle 29. Rotation of handle 29 swings the link 21 about its pivot to adjust the attitude of the cutting wheel throughout an arc in a vertical plane and its effective cutting relationship with respect to the tire tread.

For adjusting the cutting unit, and cutting wheel, axially of the platform and of the main radius of the tire, I may provide a screw bolt 30 that screw-threadedly engages a nut 31 carried by a block 32 that is locked to slide longitudinally, only, in a longitudinal slot 33 in the cutting unit supporting platform 24. As long as nut 38 is tightened on block 32 to clamp the platform 24 between nut 32 and block 38, the rotation of knob 44 will cause the travelling nut 31 to move axially on screw 30 so as to move the platform axially of the base. In the operation of the device it is only necessary to center the machine under the wheel and tire, which remain mounted on the axle of the vehicle upon which they normally run. The platform is then swung to check the cutting radius. If the radius of the platform does not conform to the true radius of the tire surface, the necessary correction may be readily made by loosening the nut 38 and moving the block 31 into proper position and then again tightening the nut 38. The block 32 pivots freely on the bolt 36, thus allowing for free swinging of platform 24 throughout the proper arc.

The block 32 also provides a vertical pivot for movements of the cutting unit. For such turning adjustment movements of the cutting unit, I provide it with suitable rolling wheels 34 to roll on the upper surface of platform 45. Such an adjustment away from axial alignment with the main radius of the tire, shown in full lines, about its vertical pivot in a counter-clockwise direction is shown in dotted lines in Figure 3. Screw bolt 36, washer 37 and nut 38 may be employed for locking the cutting unit in any desired plane of adjustment in this horizontal circular plane of adjustment. Any suitable means, such as a folding arm support 43, may be employed to adjust pivoted table 6, and consequently the drum 15, which supports and rotatably drives the tire to the desired angular disposition. The support 43 maintains platform 6 on a horizontal plane when the unit is not in use or pressed against a tire. Support 43 fits behind post 4 on the frame and resists any tendency of the heavy motor 7 to tip the platform. In operation, the weight of the motor serves to exert pressure on the tire so as to maintain good driving contact between drum 15 and the tire 46.

As an example of an arrangement of current supply to the two electric motors, I may provide a lead 35 to any suitable source leading to a box 39 with sockets to receive a plug-in lead 40 for motor 18 and a plug-in lead 41 for motor 7. At 42, I show a reversing switch for reversing the rotation of motor 18 and consequently the circular cutting blade 16.

From the foregoing, it will be seen that I have provided a simple, inexpensive and efficient machine which is relatively light in weight and easily movable from place to place for trimming and truing tires while mounted on the running wheels of a vehicle. The vehicle may have any desired wheel elevated by the conventional hoisting jack and allowed to be supported by the driving drum at the desired angle. In order to insure proper tire tread trimming through the entire periphery and transverse arc of curvature, I employ means for adjusting the relationship of the tire tread cutting unit, and hence the angular disposition of the cutting blade, with respect to the radius normal to the main radius of the tire in three different planes. Besides being a motor driven circular cutting blade, for the purpose of ease and uniformity in its cutting operation, the cutting unit, and hence the blade, is adjustable axially toward and away from the tire by the manual operation of control knob 44. Upon loosening of nut 38, the cutting unit, and hence the circular cutting blade 16, may be moved throughout an arc about the pivot 36 to adjust the angular position of the cutting blade with respect to the radius normal to the main radius of the tire. The manual crank 29, and the worm 27, afford means for adjusting the cutting blade 16 arcuately about pivots 20 and 22 to adjust the angular position of the blade in a vertical plane with respect to the radius normal to the main radius of the tire. It is to be understood that, while I have shown two separate motors, one for rotating the tire, and the other for rotating the cutting knife, I may desire to employ a single motor instead and I may also effect these two drives by other means, including mechanical means.

I claim:

1. In a machine for trimming the tread of a tire for the purpose of perfecting the running balance thereof when mounted on a vehicle wheel while on a vehicle, a main frame, a tire supporting unit including a table that is transversely pivotally adjustably connected to said main frame, a friction drum rotatably supported by said table for engaging the periphery of said tire, means for driving the drum for rotataing said tire circularly about the wheel axle as its main transverse axis, a tire tread cutting unit carried by said main frame and axially spaced from said table and friction drum and including a circular blade and means for rotating the blade for trimming the tread of said tire, said cutting unit including a platform that is longitudinally slidably mounted on said main frame and horizontally arcuately transversely adjustable thereon about a vertical axis, for adjusting the angular position of said blade arcuately horizontally with respect to the axial radius of the tread of said tire, means for adjusting said platform axially of said frame, a support for said blade transversely pivotally connected to said cutting unit platform and manually operable means for rocking said support and cutting blade about its transverse pivot for adjusting the angular disposition of said blade in a vertical plane with respect to plane of the axial radius of the tire tread.

2. In a machine for trimming the tread of a tire for the purpose of perfecting the running balance thereof when mounted on a vehicle wheel while in use on a vehicle, a main frame, a tire supporting unit including a table that is transversely pivotally adjustably connected to said main frame, a friction drum rotatably supported by said table for engaging the periphery of said tire, means for driving the drum for rotating said tire circularly about the wheel axis as its main transverse axis, a tire tread cutting unit carried by said main frame and axially from said table and friction drum and including a circular cutting blade, and means for rotating the blade for trimming the tread of said tire, said cutting unit including a platform that is longitudinally slidably mounted on said main frame by means of a pin carried by said platform engaging a slot in said frame, by means of which said platform may be bodily adjusted horizontally arcuately transversely about said pin as a vertical axis, for adjusting the angular position of said blade arcuately horizontally with respect to the axial radius of the tread of said tire, means for adjusting said platform axially of said frame, a support for carrying said blade transversely pivotally connected to said cutting unit platform and manually operable means for rocking said support and cutting blade about its transverse pivot for adjusting the angular disposition of said blade in a vertical plane with respect to the plane of the axial radius of the tire tread.

3. In a machine for trimming the tread of a tire for the purpose of perfecting the running balance thereof when mounted on a vehicle wheel while in use on a vehicle, a main frame, a tire supporting unit including a table that is transversely pivotally adjustably connected to said main frame, a friction drum rotatably supported by said table for engaging the periphery of said tire, a motor and driving means connecting said motor and drum for driving the latter for rotating said tire circularly about the wheel axle as its main transverse axis, a tire tread cutting unit carried by said main frame and axially spaced from said table and friction drum and including a motor and a circular cutting blade rotatably driven thereby for trimming the tread of said tire, a vertical pin carried by said frame, said cutting unit including a platform that is longitudinally slidably mounted on said main frame and horizontally arcuately transversely about said pin as a vertical axis, for adjusting the angular position of said blade arcuately horizontally with respect to the axial radius of the tread of said tire, means for adjusting said platform axially of said frame, a support table for said blade transversely pivotally connected to said cutting unit platform and manually operable means for rocking said support and cutting blade about its transverse pivot for adjusting the angular disposition of said blade in a vertical plane with respect to the plane of the axial radius of the tire tread.

4. In a machine for trimming the tread of a tire for the purpose of perfecting the running balance thereof when mounted on a vehicle wheel while in use on a vehicle, a main frame, a tire supporting unit including a table that is transversely pivotally adjustably connected to said main frame, a friction drum rotatably supported by said table for engaging the periphery of said tire, means for driving the drum for rotating said tire circularly about the wheel axle as its main transverse axis, a tire tread cutting unit carried by said main frame and including a motor and a circular cutting blade rotatably driven thereby for trimming the tread of said tire, said cutting unit including a platform that is longitudinally slidably mounted on said main frame and axially spaced from said table and friction drum and horizontally arcuately transversely adjustable thereon about a vertical axis, for adjusting the angular position of said blade arcuately horizontally with respect to axial radius of the tread of said tire, means for adjusting said platform axially of said frame, a table for carrying said blade and its driving motor and transversely pivotally connected to said cutting unit platform and manually operable means for rocking said table, motor and cutting blade about its transverse pivot for adjusting the angular disposition of said blade in a vertical plane with respect to the plane of the axial radius of the tire tread.

5. In a machine for trimming the tread of a tire for the purpose of perfecting the running balance thereof when mounted on a vehicle wheel while in use on a vehicle, a main frame, a tire supporting unit including a table that is transversely pivotally adjustably connected to said main frame, a friction drum rotatably supported by said table for engaging the periphery of said tire, a motor and driving means connecting said motor and drum for driving the latter for rotating said tire about the wheel axle as its main transverse axis, a tire tread cutting unit carried by said main frame and including a motor and a circular cutting blade rotatably driven thereby for trimming the tread of said tire, said cutting unit including a platform that is longitudinally slidably mounted on said main frame and axially spaced from said table and friction drum and, by means of a pin carried by said frame, horizontally arcuately transversely adjustable thereon about a vertical axis, for adjusting the angular position of said blade arcuately horizontally with respect to axial radius of the tread of said tire, means for adjusting said platform axially of said frame, a table for carrying said blade and its driving motor and transversely pivotally connected to said cutting unit platform and manually operable means for rocking said table, motor and cutting blade about its transverse pivot for adjusting the angular disposition of said blade in a vertical plane with respect to the plane of the axial radius of the tire tread.

6. In a machine for trimming the tread of a tire for the purpose of perfecting the running balance thereof when mounted on a vehicle wheel while in use on a vehicle, a main mobile frame, a tire supporting unit including a table that is transversely pivotally adjustably connected to said main frame, a friction drum rotatably supported by said table for engaging the periphery of said tire, a motor and driving means connecting said motor and drum for driving the latter for rotating said tire about the wheel axle as its main transverse axis, a tire tread cutting unit carried by said main frame and including a motor and a circular cutting blade rotatably driven thereby for trimming the tread of said tire, said cutting unit including a platform that is longitudinally slidably mounted on said main frame and axially spaced from said table and friction drum by means of a pin carried by said frame engaging a slot in said platform, by means of which said platform may be bodily adjusted horizontally arcuately transversely about said pin as a vertical axis, for adjusting the angular position of said blade arcuately horizontally with respect to the axial radius of the tread of said tire, manually operable means, including a worm and nut, for adjusting said platform axially of said frame, a table for carrying said blade and its driving motor and transversely pivotally connected to said cutting unit platform and manually operable means for rocking said table, motor and cutting blade about its transverse pivot for adjusting the angular disposition of said blade in a vertical plane with respect to the plane of the axial radius of the tire tread.

References Cited in the file of this patent
UNITED STATES PATENTS

| | | |
|---|---|---|
| 1,311,578 | Stilson | July 29, 1919 |
| 1,567,472 | Skiles | Dec. 29, 1925 |
| 1,668,214 | Liebau | May 1, 1928 |
| 1,891,789 | Wheeler | Dec. 20, 1932 |
| 1,961,499 | Kunkel | June 5, 1934 |
| 1,975,930 | Errig et al. | Oct. 9, 1934 |
| 2,000,129 | Dunnam | May 7, 1935 |
| 2,200,575 | Haskins | May 14, 1940 |
| 2,350,375 | Stephens | June 6, 1944 |
| 2,601,810 | James | July 1, 1952 |
| 2,681,108 | Chanyi | June 15, 1954 |